United States Patent [19]
Kim et al.

[11] Patent Number: 5,348,664
[45] Date of Patent: Sep. 20, 1994

[54] PROCESS FOR DISINFECTING WATER BY CONTROLLING OXIDATION/REDUCTION POTENTIAL

[75] Inventors: Yong H. Kim, Flossmoor; Roger L. Strand, Bourbonnais, both of Ill.

[73] Assignee: Stranco, Inc., Bradley, Ill.

[21] Appl. No.: 967,804

[22] Filed: Oct. 28, 1992

[51] Int. Cl.⁵ .................... C02F 1/70; C02F 1/76; C02F 1/78

[52] U.S. Cl. .................... 210/746; 210/754; 210/757; 210/760

[58] Field of Search .............. 210/746, 757, 758, 754, 210/764, 760

[56] References Cited

U.S. PATENT DOCUMENTS

| | | | |
|---|---|---|---|
| 2,289,589 | 7/1942 | Pomeroy | 210/746 |
| 3,351,542 | 11/1967 | Oldershaw et al. | 204/149 |
| 3,458,414 | 7/1969 | Crane et al. | 204/149 |
| 3,669,857 | 6/1972 | Kirkham et al. | 204/151 |
| 3,733,266 | 5/1973 | Bishop et al. | 210/668 |
| 4,033,871 | 7/1977 | Wall | 210/169 |
| 4,053,403 | 10/1977 | Bachhofer et al. | 210/752 |
| 4,056,469 | 11/1977 | Eichenhofer et al. | 210/752 |
| 4,129,493 | 12/1978 | Tighe et al. | 204/228 |
| 4,136,005 | 1/1979 | Persson et al. | 204/266 |
| 4,137,166 | 1/1979 | Heimberger et al. | 210/752 |
| 4,149,952 | 4/1979 | Sato et al. | 204/258 |
| 4,224,154 | 9/1980 | Steininger et al. | 210/96.1 |
| 4,256,552 | 3/1981 | Sweeney | 204/98 |
| 4,263,119 | 4/1981 | Mose et al. | 204/257 |
| 4,323,092 | 4/1982 | Zabel | 210/169 |
| 4,340,488 | 7/1982 | Toth et al. | 210/705 |
| 4,340,489 | 7/1982 | Adams et al. | 210/718 |
| 4,366,064 | 12/1982 | Mihelic et al. | 210/668 |
| 4,381,240 | 4/1983 | Russell | 210/746 |
| 4,384,961 | 5/1983 | Abrams et al. | 210/746 |
| 4,385,973 | 5/1983 | Reis et al. | 210/746 |
| 4,393,037 | 7/1983 | Delaney et al. | 423/226 |
| 4,409,074 | 10/1983 | Iijima et al. | 204/98 |
| 4,432,860 | 2/1984 | Bachot et al. | 204/296 |
| 4,435,291 | 3/1984 | Matsko | 210/739 |
| 4,496,452 | 1/1985 | Bianchi | 204/266 |
| 4,508,697 | 4/1985 | Burrus | 210/757 |
| 4,550,011 | 10/1985 | McCollum | 422/68 |
| 4,574,037 | 3/1986 | Samejima et al. | 204/98 |
| 4,599,159 | 7/1986 | Hilbig | 204/266 |
| 4,627,897 | 12/1986 | Tetzlaff et al. | 204/60 |
| 4,767,511 | 8/1988 | Aragon | 210/746 |
| 4,818,412 | 4/1989 | Conlan | 210/746 |

FOREIGN PATENT DOCUMENTS

| | | | |
|---|---|---|---|
| 1079423 | 6/1980 | Canada . | |
| 60202792 | 10/1985 | Japan . | |
| 1592287 | 9/1990 | U.S.S.R. | 210/746 |
| 2027004 | 2/1980 | United Kingdom | 210/746 |

OTHER PUBLICATIONS

Stranco Capsule Case History #113.
Stranco Capsule Case History #702.
Stranco Capsule Case History #703.
Fundamentals of Water Disinfection; J. Water SRT-Aqua, vol. 40, No. 6, pp. 346-356, 1991.

*Primary Examiner*—Neil McCarthy
*Attorney, Agent, or Firm*—Welsh & Katz, Ltd.

[57] ABSTRACT

A method is disclosed for the treatment of water, containing an oxidizing agent, flowing through a conduit or contained in a vessel. The oxidation reduction potential or the ORP of the water is continuously measured at a sensing position and a reducing agent is fed to the water in response to the measured ORP to neutralize the oxidizing agent and maintain a desired concentration of reducing agent residuals in the water at the second sensing position.

11 Claims, 1 Drawing Sheet

ORP vs. CHLORINE AND SULFITE LEVELS

PROCESS FOR DISINFECTING WATER BY CONTROLLING OXIDATION/REDUCTION POTENTIAL

BACKGROUND OF THE INVENTION

This invention is directed to methods for treating water containing a oxidizing agent by controlling the addition of a reducing agent to the water as it flows through a conduit or is contained in a vessel, to neutralize the oxidizing agent and control the concentration of the reducing agent in the water after neutralization. More particularly, this invention relates to a method of using oxidation reduction measurement technology to dechlorinate wastewater and control the residual reducing agent concentration in the wastewater prior to discharge from a wastewater treatment plant.

In wastewater treatment systems, the number of harmful bacteria or viruses per unit of wastewater must be reduced to acceptable levels prior to the return of the wastewater to the environment, a process known as disinfection. Disinfection of the wastewater is typically carried out by the introduction of an oxidizing agent into the wastewater as the wastewater enters a contactor in a wastewater treatment plant. As the wastewater flows through the contactor, the oxidizing agent attacks and destroys the harmful bacteria and largely disinfects the wastewater. Prior to the discharge of the wastewater from the contactor into the environment, a reducing agent is added to the wastewater to remove the oxidizing agent because even small amounts of oxidizing agents may be harmful to aquatic life. The amount of reducing agent added is generally a large overdose of the amount necessary to remove the oxidizing agent. Therefore, the water is discharged with a high concentration level of the reducing agent.

It is known that the kill rate on bacteria and viruses can be characterized by the oxidation reduction potential or ORP of the wastewater. The addition of the oxidizing agents raises the ORP of the wastewater, resulting in disinfection. Therefore, an oxidizing agent is added to the wastewater in such an amount so that the wastewater reaches a predetermined ORP level which will result in disinfection. The oxidizing agent typically is chlorine, although bromine, ozone, iodine and the like are also used.

Devices which measure ORP of a fluid are referred to as oxidation/reduction potential or redox probes. In a redox probe, a noble metal such as platinum is used as one electrode. The platinum electrode is exposed to the wastewater. Oxidizing agents present in the wastewater exert an EMF (electromotive force) on the platinum, changing its electrical potential (voltage). The analyzer component of the probe then compares this voltage to a constant-voltage reference electrode. This measurement is displayed as millivolts or concentration in mg/l. The measurement output from the redox probe may be used to control the addition of the oxidizing agent.

Concern over the environmental impact of the oxidizing agent in wastewater has lead to a desire to neutralize the oxidizing agent in the wastewater after disinfection and prior to the discharge of the wastewater into the environment. This neutralization is generally achieved through the addition of a reducing agent to the wastewater. The most prevalent types of reducing agents used are compounds which form sulfite upon introduction into the wastewater such as sodium-bisulfite or soluble metallic sulfite.

It is known that a redox probe may be used to measure low levels of oxidizing agents in the wastewater. The output from the probe has been used to control the addition of a reducing agent when the goal of the neutralization was to maintain a low concentration level of chlorine in the discharge of the wastewater.

Other prior art sensing devices, such as the amperometric and colorimetric analyzers, typically cannot sense the presence of reducing agents in wastewater and are only marginally accurate when trying to measure oxidizing agent residuals near zero. Therefore, when the goal is to completely neutralize the oxidizing agent, these sensing devices may be placed before the sulfite feeder to measure the oxidizing agent content of the wastewater and then an amount of sulfite is added and mixed into the wastewater to neutralize the measured oxidizing agent level. However, by placing the sensing device before the sulfite feeder, the sensing device cannot then determine whether the amount of sulfite added has completely neutralized the oxidizing agent. Therefore, to insure complete neutralization, the amount of sulfite added to the wastewater is generally a large overdose of the stoichiometric amount necessary to neutralize the measured oxidizing agent level.

This overfeeding of sulfite has several drawbacks. Overfeeding adds cost to the neutralization program. Excess sulfite may also pose a health hazard and therefore run afoul of governmental regulations. The excess sulfite may also have a negative impact of the environment by depleting dissolved oxygen which is essential to aquatic life.

It is therefore an object of the present invention to provide a method of controlling the addition of a reducing agent to water flowing through a conduit or contained in a vessel to completely neutralize an oxidizing agent in the water and control the concentration of the reducing agent in the discharge of the water from the conduit or in the water in the vessel.

A related object of the present invention is to provide a method of using oxidation reduction measurement technology to control the residual reducing agent concentration level in wastewater discharge from the treatment plant.

It is an additional object of the present invention to provide a method of operatively controlling the addition of the reducing agent in response to the measured concentration levels of the reducing agent residual in the wastewater after addition of the reducing agent.

It is a still further object of the present invention to provide a method for reducing agent residual control which utilizes a measuring device which is sensitive to low concentration levels of the reducing agent in the wastewater.

SUMMARY OF THE INVENTION

In keeping with one aspect of this invention, a method is disclosed for neutralizing an oxidizing agent in water flowing through a conduit or contained in a vessel. The ORP of the water is continuously measured at a sensing position. A reducing agent is added to the water in response to the measured ORP to completely neutralize the oxidizing agent and maintain a desired reducing agent residual level at the sensing position.

The present invention utilizes a redox probe which accurately measures low concentration levels of the reducing agent in water. The redox probe is incorporated into a reducing agent addition system which varies the rate of reducing agent added to the water to neutralize the oxidizing agent and tightly control the concentration level of the reducing agent residual present in the water.

According to the preferred embodiment of the invention, the water is wastewater flowing through a contactor forming part of a wastewater treatment plant, and the method is for the dechlorination of the wastewater and the maintenance of a preferred level of sulfite residual in the discharge from the contactor.

DETAILED DESCRIPTION OF THE INVENTION

The reducing agent addition system of this invention is usable generally where the neutralization of an oxidizing agent or the maintenance of a residual of a reducing agent in water is desired. For example, this system can be used to remove chlorine from water in a reverse osmosis system where the chlorine can damage the semi-permeable membrane forming part of the osmosis system. However, the system according to the preferred embodiment of the invention is a system for the neutralization of an oxidizing agent present in wastewater through the maintenance of a desired concentration level of a reducing agent, prior to the discharge of the wastewater to the environment.

Figure 1:
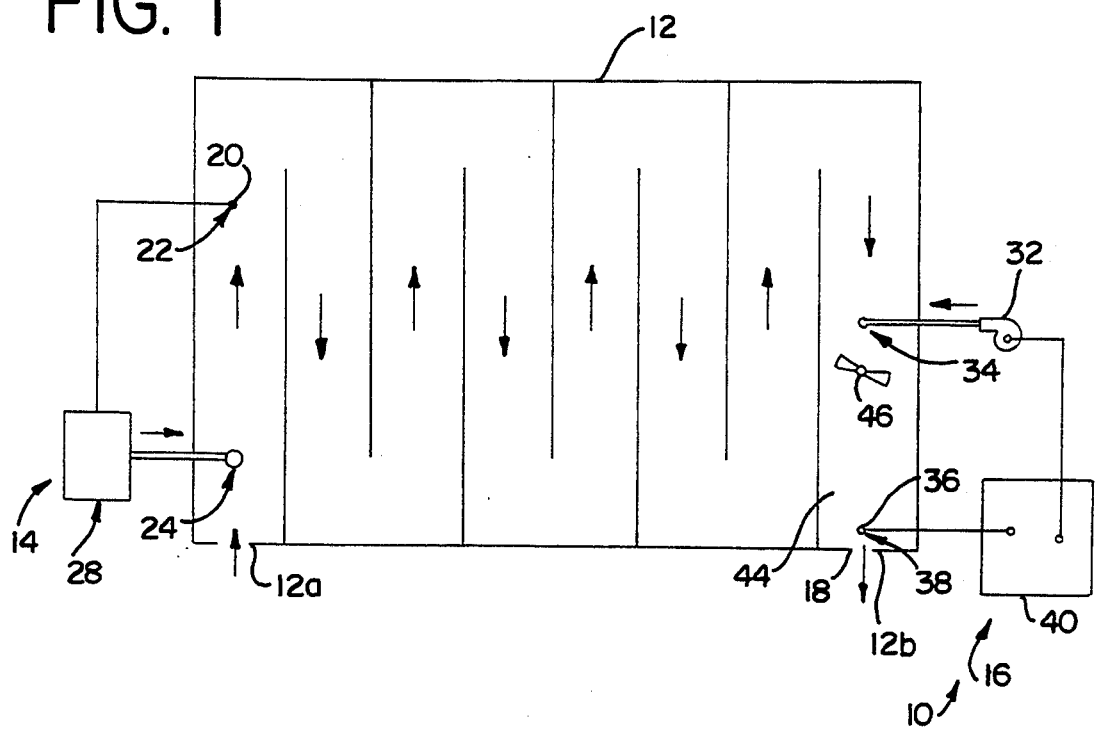
FIG. 1 is a schematic diagram of a disinfection and oxidizing agent neutralization apparatus in accordance with the invention.

FIG. 1 illustrates an apparatus 10, constructed in accordance with the present invention, for performing the method of this invention. In a typical wastewater treatment plant, disinfection of wastewater occurs as the wastewater flows through a conduit such as a contactor 12. The wastewater enters the contactor 12 through an inlet 12a, flows downstream in the direction indicated by arrows, and exits through an outlet 12b. To disinfect the wastewater an oxidizing agent is added to the wastewater shortly after the wastewater enters through the inlet 12a by an oxidizing agent addition system 14. The amount of oxidizing agent added to the wastewater is determined by the measured oxidation/reduction potential (ORP) of the wastewater.

After the desired disinfection of the wastewater has occurred, a reducing agent is added to the wastewater by a reducing agent addition system 16 to neutralize the oxidizing agent in the wastewater and maintain a desirable residual level of the reducing agent in the wastewater. The amount of reducing agent added to the wastewater is determined by the measured ORP of the wastewater prior to discharge into the environment. After the oxidizing agent has been neutralized, the wastewater is released to the environment through an effluent weir 18 located at the outlet 12b.

Oxidizing agents used in the disinfection of wastewater include bromine, chlorine dioxide, ozone and chlorine. Chlorine is the oxidizing agent which is generally used. The reducing agent generally used is a sulfite bearing compound such as sulphur dioxide or a sodium bisulfite. Therefore, in the following description of the preferred embodiment and method for practicing the invention, the description will refer to these two substances as the oxidizing agent and reducing agent. It should be understood, however, that the invention is not limited to this particular oxidizing agent and reducing agent.

The oxidizing agent addition system 14 includes an inlet redox probe 20 which continuously measures the ORP of the wastewater at a first sensing position 22. The first sensing position 22 is downstream from a chlorine addition location 24 which is near the inlet 12a. The oxidizing agent addition system 14 also includes a chlorine feed system 28 which adds chlorine to the wastewater at the chlorine addition location 24.

A first sensing signal is produced by the inlet redox probe 20 in response to the measured ORP of the wastewater at the first sensing position 22. The first sensing signal is then sent to the chlorine feed system 28 so that rate of chlorine addition to the wastewater can be varied in relation to the sensing signal. The variation in the addition rate alters the ORP of the wastewater to achieve a desired ORP. Therefore, the addition of chlorine by the chlorine feed system 28 to the wastewater is operatively controlled by the ORP of the wastewater as measured by the inlet redox probe 20.

Downstream of the oxidizing agent addition system 14 is the apparatus 10 which includes the reducing agent supply system 16. The reducing agent supply system 16 includes a sulfite addition device 32, typically a pump, which adds sulfite to the wastewater at sulfite addition location 34. The sulfite addition location 34 is preferably located at a location which allows the previously added chlorine the contact time necessary to disinfect the wastewater. The reducing agent addition system 16 also includes an effluent ORP measuring device such as an effluent redox probe 36 which continuously measures the ORP of the wastewater at a second sensing position 38. Because the measuring capability of the effluent redox probe 36 is resistant to fouling substances found in the wastewater, the measuring electrode of the effluent redox probe is preferably submerged directly in the wastewater adjacent the effluent weir 18. However, the electrode could be submerged in a slip stream from the contactor 12.

The effluent redox probe 36 produces a second signal in response to the measured ORP of the wastewater. The second signal is transmitted to a sulfite feed controller 40 which amplifies the second signal and compares the signal with a predetermined or desired ORP value. The sulfite controller 40 then generates a second or sulfite feed control signal dependent on the deviation between the measured ORP of the wastewater and the desired ORP value. The sulfite feed control signal is sent to the sulfite addition device 32 so that the rate of sulfite addition to the wastewater can be varied in relation to the control signal. The variation in the addition rate alters the ORP of the wastewater to achieve the desired ORP value.

As is later described, the effluent redox probe 36 can accurately determine if both the chlorine and sulfite in the wastewater have been neutralized or if the wastewater contains a low level of chlorine or a low level of sulfite at the second sensing position 38. Therefore the second sensing position is preferably located after the sulfite addition location 34. With this placement, the effluent redox probe 36 can directly determine the effectiveness of the rate of sulfite addition in neutralizing the chlorine remaining in the wastewater after disinfection. In dependence on the measured concentration level, the rate of sulfite added to the wastewater by the sulfite supply pump is adjusted to tightly control the concentration level of sulfite present in the wastewater discharged into the environment.

Because it is desired that the effluent redox probe 36 measure the ORP of the wastewater after the sulfite has neutralized the residual chlorine in the wastewater, mixing of the sulfite and wastewater is needed between the sulfite addition location 34 and the effluent redox probe 36. A mechanical mixer 46, sized to supply the necessary mixing, may be placed immediately downstream of the sulfite addition location 34.

In operation, the chlorine feed system 28 adds chlorine to the wastewater as it enters the contactor 12. At the first sensing location 22 the inlet redox probe 20 continuously measures the ORP of the wastewater and generates the first sensing signal. The first sensing signal is sent to the chlorine feed system 28. The chlorine feed system 28 decreases the chlorine feed rate to the wastewater if the measured ORP is greater than the desired ORP. The chlorine feed system 28 increases the chlorine feed rate if the measured ORP is less than the desired ORP. Therefore, the oxidizing agent addition system 14 is able to automatically increase or decrease the addition of an oxidizing agent in response to the measured ORP of the wastewater to maintain a desired ORP potential in the wastewater.

As the wastewater moves through the contactor the now chlorine forms chlorine residuals which act as a biocide and destroy the bacteria and viruses. Sulfite is then added to the wastewater at the sulfite addition location 34. The sulfite reacts with the chlorine to neutralize the chlorine or dechlorinate the wastewater. Dechlorination is assisted by the mixing of the wastewater by the mechanical mixer 46.

Just prior to the effluent weir 18, where the wastewater is discharged to the environment, the effluent redox probe 36 continuously measures the ORP of the wastewater. The effluent redox probe 36 generates an electrical signal responsive to the measured ORP of the wastewater. This signal is provided to the sulfite feed controller 40. The sulfite feed controller 40 amplifies and compares the signal to a desired ORP value. The desired ORP value corresponds to a low concentration level of sulfite, which indicates and ensures that the chlorine has been completely neutralized. The desired ORP value could also respond to a point where both the chlorine and sulfite have been completely neutralized.

After comparing the signal to the desired ORP value, the sulfite feed controller 40 produces a deviation value and converts the deviation value to a sulfite control signal. The sulfite control signal is sent to the sulfite addition device 32. The sulfite addition device 32 decreases the sulfite feed rate to the wastewater if the measured ORP value of the wastewater is less than the desired ORP value indicating an excess of sulfite. The sulfite addition device 36 increases the sulfite feed to the wastewater if the effluent redox probe 32 measures an ORP value which is greater than the predetermined ORP value indicating a level of sulfite below the acceptable level or a presence of chlorine or chlorine residuals. Therefore, the reducing agent addition system 16 is able to automatically increase or decrease the addition rate of a reducing agent such as a sulfite bearing compound in response to the measured ORP of the wastewater to maintain a desired ORP with the desired ORP corresponding to a complete neutralization of both the chlorine and sulfite or a particular concentration level of sulfite residuals in the wastewater discharged to the environment.

Figure 2:
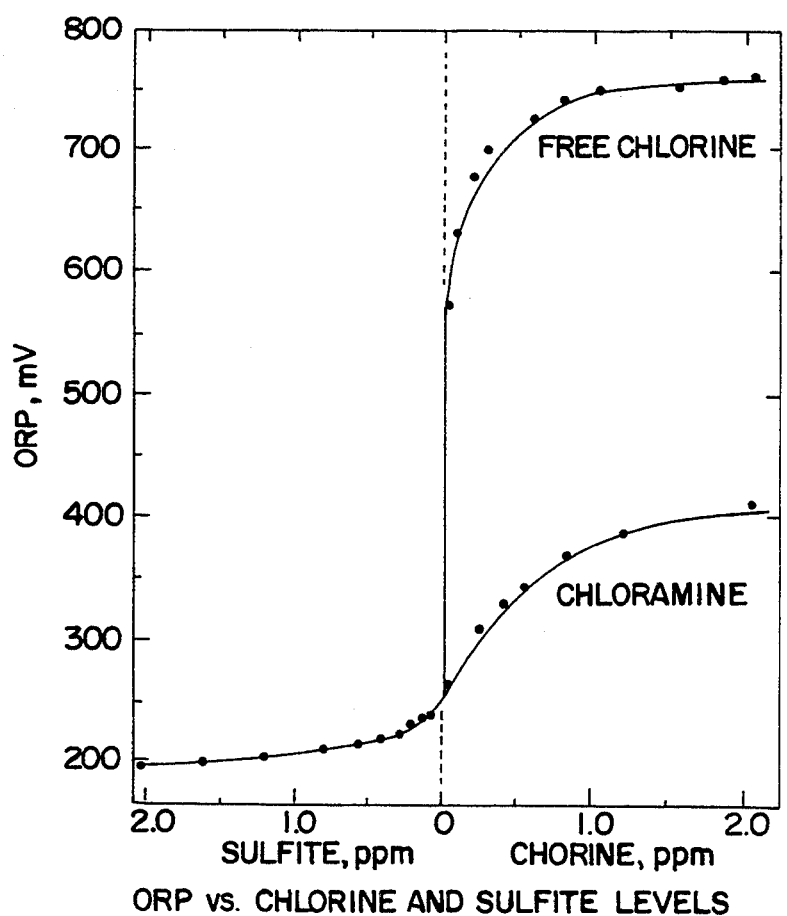
FIG. 2 is a chart showing the results of tests with an embodiment of the invention using solutions of water containing various concentrations of oxidizing agents and a reducing agent.

FIG. 2 illustrates the improved distinguishing ability and sensitivity provided by a redox probe in the sensing of a neutral sample of water and various concentrations of sulfite in water samples. Several different solutions were made by mixing known amounts of sulfite, chlorine and chloramines and tap water. Then, a redox probe was inserted into the different solutions. FIG. 2 is a graph of the millivolt (mv) readings produced by the redox probe in the various solutions.

A neutral sample of water without chlorine, chloramines or sulfite produced a base redox probe reading of 250 mv. For a 0.1 part per million (ppm) free chlorine solution, the probe produced a 676 mv signal which is a 170% increase over the neutral reading. For a 0.1 ppm chloramine solution, the probe produced a 278 mv reading, which is a 11% increase over the neutral reading.

At a 0.1 ppm sulfite solution, the redox probe produced a 233 mv signal which is a 7% decrease over the neutral reading. At a 0.6 ppm sulfite solution, the probe had a 214 mv signal which is a 14% decrease over the neutral reading and a 8% decrease over the reading for a 0.1 ppm sulfite solution. At a 1.2 ppm concentration of sulfite, the probe had a 203 mv signal which is a 19% decrease over the neutral reading and a 5% decrease over the reading for a 0.6 ppm sulfite solution.

This data indicates that the redox probe is sensitive to both oxidizing agents and reducing agents, with logarithmic response to changes in the concentration levels of these two types of agents from a base neutral reading. In addition, the redox probe can measure and distinguish between various low concentration levels of reducing agents such as sulfite.

Therefore, the sensing signal produced by the redox probe represents an accurate determination of the presence and concentration level of oxidizing agents and reducing agents in water flowing through a conduit. The reducing agent addition system, in response to this sensing signal, may vary the addition of the reducing agents to the water to completely neutralize the oxidizing agent. Complete neutralization may also include the neutralization of the added reducing agent or the maintenance of a desired concentration level of reducing agent in the water discharged from the conduit.

A specific embodiment of the apparatus and process for disinfection and dechlorination according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

I claim:

1. A method for the treatment of wastewater containing an oxidizing agent selected from the group consisting of bromine, chlorine dioxide, ozone and chlorine, said method substantially completely neutralizing the oxidizing agent in the wastewater, the wastewater flowing through a conduit, said method comprising the steps of:

(a) establishing a relationship between the measured oxidation reduction potential of the wastewater and the level of reducing agent in the wastewater;
(b) measuring the oxidation/reduction potential at a sensing position in the conduit;
(c) controlling the addition of a reducing agent to the wastewater at an additional location, said reducing agent being a compound which forms sulfite upon introduction into the wastewater, and added in response to the measured oxidation/reduction potential of the wastewater at said sensing position; and
(d) repeating steps b and c until, according to the relationship established in step a, the measured oxidation reduction potential indicates a residual concentration of reducing agent in the wastewater at said sensing position.

2. The method of claim 1 wherein said addition location is upstream of said sensing position.

3. The method of claim 1 wherein said reducing agent is sulfite.

4. The method of claim 1 wherein said measuring step includes measuring with a redox probe.

5. The method of claim 1 wherein said measuring step includes measuring with a sensing means having a logarithmic response to the presence of the reducing agent in the wastewater.

6. The method of claim 1 further including mixing the reducing agent and the wastewater upstream of said first sensing position.

7. The method of claim 1 wherein said measuring step includes continuously measuring the oxidation/reduction potential of the wastewater.

8. The method of claim 1 wherein the conduit is a chlorine contactor forming part of a wastewater treatment plant, the chlorine contactor having an inlet and an outlet.

9. The method of claim 8 further including:
measuring of the oxidation/reduction potential of the wastewater at a second sensing position near the inlet of said contactor upstream of said sensing position;
adding the oxidizing agent to the wastewater at a second addition location upstream of said second sensing position, in response to the measured oxidation/reduction potential of the wastewater at said second sensing position.

10. A method for the treatment of wastewater containing an oxidizing agent selected from the group consisting of bromine, chlorine dioxide, ozone and chlorine, said method substantially completely neutralizing the oxidizing agent in the wastewater, the wastewater contained in a vessel, said method comprising the steps of:
establishing a relationship between the measured oxidation reduction potential of the wastewater and the level of reducing agent in the wastewater;
measuring the oxidation/reduction potential at a sensing position;
controlling the addition of a reducing agent to the wastewater at an addition location, said reducing agent being a compound which forms sulfite upon introduction into the wastewater, said controlling in response to the measured oxidation/reduction potential of the wastewater at said sensing position; and
according to the established relationship, maintaining a desired level of reducing agent in the wastewater at the sensing position.

11. The process of claim 1 wherein said residual concentration of reducing agent is greater than 0.01 parts per million.

* * * * *